United States Patent [19]
Hamilton et al.

[11] Patent Number: 5,504,816
[45] Date of Patent: Apr. 2, 1996

[54] METHOD AND APPARATUS FOR CONTROLLING ACCESS TO DIGITAL SIGNALS

[75] Inventors: Jeffrey S. Hamilton, Doylestown; Marc Kauffman, Ft. Washington; Lawrence D. Vince, Lansdale, all of Pa.

[73] Assignee: GI Corporation, Hatboro, Pa.

[21] Appl. No.: 191,031

[22] Filed: Feb. 2, 1994

[51] Int. Cl.[6] ..................... H04L 9/00
[52] U.S. Cl. ..................... 380/20; 380/49
[58] Field of Search ............... 380/20, 49, 25; 341/63

[56] References Cited

U.S. PATENT DOCUMENTS

| | | | |
|---|---|---|---|
| 4,222,068 | 9/1980 | Thompson | 380/20 |
| 4,613,901 | 9/1986 | Gilhousen et al. | 380/20 |
| 4,701,745 | 10/1987 | Waterworth | 341/63 |
| 4,817,146 | 3/1989 | Szczutkowski et al. | 380/49 |
| 5,138,659 | 8/1992 | Kelkar et al. | 380/20 |
| 5,144,664 | 9/1992 | Esserman et al. | 380/20 |
| 5,153,918 | 10/1992 | Tuai | 380/25 |
| 5,173,775 | 12/1992 | Walker | 358/141 |
| 5,173,900 | 12/1992 | Miller et al. | |
| 5,230,019 | 7/1993 | Yanagimichi et al. | |
| 5,235,641 | 8/1993 | Nozawa et al. | 380/49 |
| 5,301,245 | 4/1994 | Endoh | 380/20 |
| 5,341,425 | 8/1994 | Wasilewski et al. | 380/20 |

OTHER PUBLICATIONS

J. Vigarie, "A Device for Real–Time Modification of Access Conditions in a D2–MAC/Packet Eurocrypt Signal: The Transcontroller," 18th International Television Symposium and Technical Exhibition, Jun. 10, 1993 –Jun. 15, 1993, Montreux, Switzerland, pp. 761–769.

"Proposal to Cable Television Labs, Inc, PBS, TeleCom Inc, Viacom for DigiCipher™ Digital Compression Program Delivery System," General Instruments Corp., Video Cipher Division, San Diego, CA, Nov. 27, 1991, pp. 1–vi, 6, 11, 12, 17, 20, 50, 51, 52, 53.

*Primary Examiner*—Salvatore Cangialosi
*Attorney, Agent, or Firm*—Barry R. Lipsitz; Ralph F. Hoppin

[57] ABSTRACT

A method and apparatus are provided for controlling access to digital signals sent via a first communication path and retransmitted over a second communication path. The digital signals, having been encrypted by a first encryption scheme and sent over the first communication path, are received and decrypted. The decrypted signals are then retransmitted over the second communication path using a second encryption scheme that differs from the first encryption scheme.

15 Claims, 4 Drawing Sheets

METHOD AND APPARATUS FOR CONTROLLING ACCESS TO DIGITAL SIGNALS

BACKGROUND OF THE INVENTION

The present invention relates to controlling access to digital signals distributed via a cable television ("CATV") network or the like, and more particularly to a method and apparatus for reencrypting digital signals received from a first communication path (e.g. satellite) prior to retransmission along a second path such as a CATV network. The reencrytion is used to control subscriber access to services provided via the second path, such as digital video and audio services, audio only services, data services and the like.

In cable television networks, subscribers are connected to a transmission stream carrying, e.g., television programs, radio programs, and associated data which originates at a headend. To generate the transmission stream, the headend receives signals from a variety of sources including, for example, broadcast stations, data sources and premium channels via satellite. The signals are combined at the headend into various packages for retransmission to subscribers over the CATV network.

The CATV network may, e.g., be configured as a ring network, star or a tree and branch type structure which extends from the headend to feed various authorized subscribers. Subscribers may be arranged into groups based upon an attribute such as type of programming services required. For example, a subscriber such as a hospital requires a particular type of CATV service, i.e., a package including such services as data service channels and pertinent hospital video/audio channels as opposed to a residential subscriber which may require a package including family oriented channels.

Presently, to retain control and authorize access to various subscriber groups, the headend receives the various signals and, where received in an encrypted format, decrypts and retransmits the signal in a conventional scrambled analog format to provide security for premium channels, thereby preventing unauthorized use. Converters and descramblers located at the subscriber's residence or business are connected to receive and descramble the transmitted analog signal for end use. Encryption schemes for use in digital access control are well known, as evidenced by U.S. Pat. No. 4,613,901 to Gilhousen et al., which discloses a system and method for encrypting and selectively decrypting television signals. An example of an analog scrambling system useful in CATV systems can be found in U.S. Pat. No. 4,222,068 to Thompson.

Unfortunately, pirating of the signal transmitted from the headend cannot be prevented. A large market for pirate descramblers and the like is ready made by the large number of possible end users, thus making it very profitable to breach the security placed on the transmission at or before the headend. This problem is particularly acute in a digital transmission system, where the use of the same encryption scheme along the entire path from a programmer to an end user (e.g., via satellite and cable communication paths) would enable a security breach to have far reaching effects. Therefore, it would be advantageous to provide a method and apparatus for segmenting the network (e.g., between the satellite and CATV systems or between different CATV systems) to minimize the impact of a security breach. It would be further advantageous to provide a security scheme for the transmission of digital television signals over a cable television network. While past CATV systems have been primarily analog, the development of digital video compression and transmission techniques has made digital television a reality. Yet another advantage would be to decrypt and reencrypt a signal without decompressing the data, video and/or audio information being transmitted. Digital audio services via a CATV network have also been introduced, further increasing the demand for effective security schemes.

In segmenting a communication network, several additional advantages including increased control over billing, tiering, pricing, and service packaging throughout the network are realized. For example, in the situation where a CATV network extends throughout more than one town or city, different pricing for services and different service packages may have been contracted for or otherwise be desirable in different towns. Moreover, different subscriber groups, such as businesses and residences would require different service packages, as previously described, and a segmented network would provide additional control over service packaging for various portions of the network. The reliable provision of access control for such needs must be achieved in order to bring these features to the marketplace.

The present invention provides a method and apparatus for communicating encrypted digital signals over a network having the aforementioned features and advantages.

SUMMARY OF THE INVENTION

In accordance with the present invention, a method and apparatus are provided for controlling access to digital signals received via a first communication path (e.g., a satellite downlink) and retransmitted over a second communication path (e.g., a CATV network). To achieve this, digital signals encrypted by a first encryption scheme and transmitted over the first communication path are received and then retransmitted over the second communication path using a second encryption scheme that differs from the first encryption scheme. The digital signals sent via the second communication path and encrypted by the second encryption scheme may also be received and then retransmitted over a third communication path using a third encryption scheme that differs from the first and second encryption schemes. The digital signals sent via the third communication path and encrypted by the third encryption scheme may be further received and then retransmitted over additional communication paths using additional encryption schemes.

In an illustrated embodiment, the digital signals, prior to being retransmitted over the second, third, or additional communication paths, are decrypted and then reencrypted by the second, third or additional encryption schemes. Each of the second, third and additional encryption schemes may differ by encryption keys used by the encryption schemes. The encryption schemes themselves may also differ. For end use, different authorized subscribers may receive, and decrypt accordingly, the digital signals reencrypted and sent via the second, third and/or additional communication paths.

In accordance with an illustrated embodiment of the present invention, control data is transmitted with the digital signals. The control data may include information for "internal" use such as enabling an authorized subscriber to decode and use the encrypted television signals. The control data may also include information such as program or movie identification for "external" use by authorized subscribers. A first portion of the control data may be common to the data streams received from the first communication path and retransmitted over the second, third and/or additional communication paths, while other portion(s) thereof are modified and/or added at the headend prior to retransmission to subscribers.

Also in accordance with the illustrated embodiment of the present invention, the signals are decrypted prior to reencryption using the second, third or additional encryption scheme(s). For additional security, the decrypted digital signals may be reencrypted using a plurality of different encryption schemes for transmission over a corresponding plurality of different segments of the network. The digital signals retransmitted over the CATV network may include a multiplex of television signals, audio only signals, and data signals.

In an illustrated embodiment, the first, second and third encryption schemes differ by encryption keys used by the encryption schemes. A plurality of different encryption schemes may correspond to different subscriber groups.

DETAILED DESCRIPTION OF THE INVENTION

Figure 1:
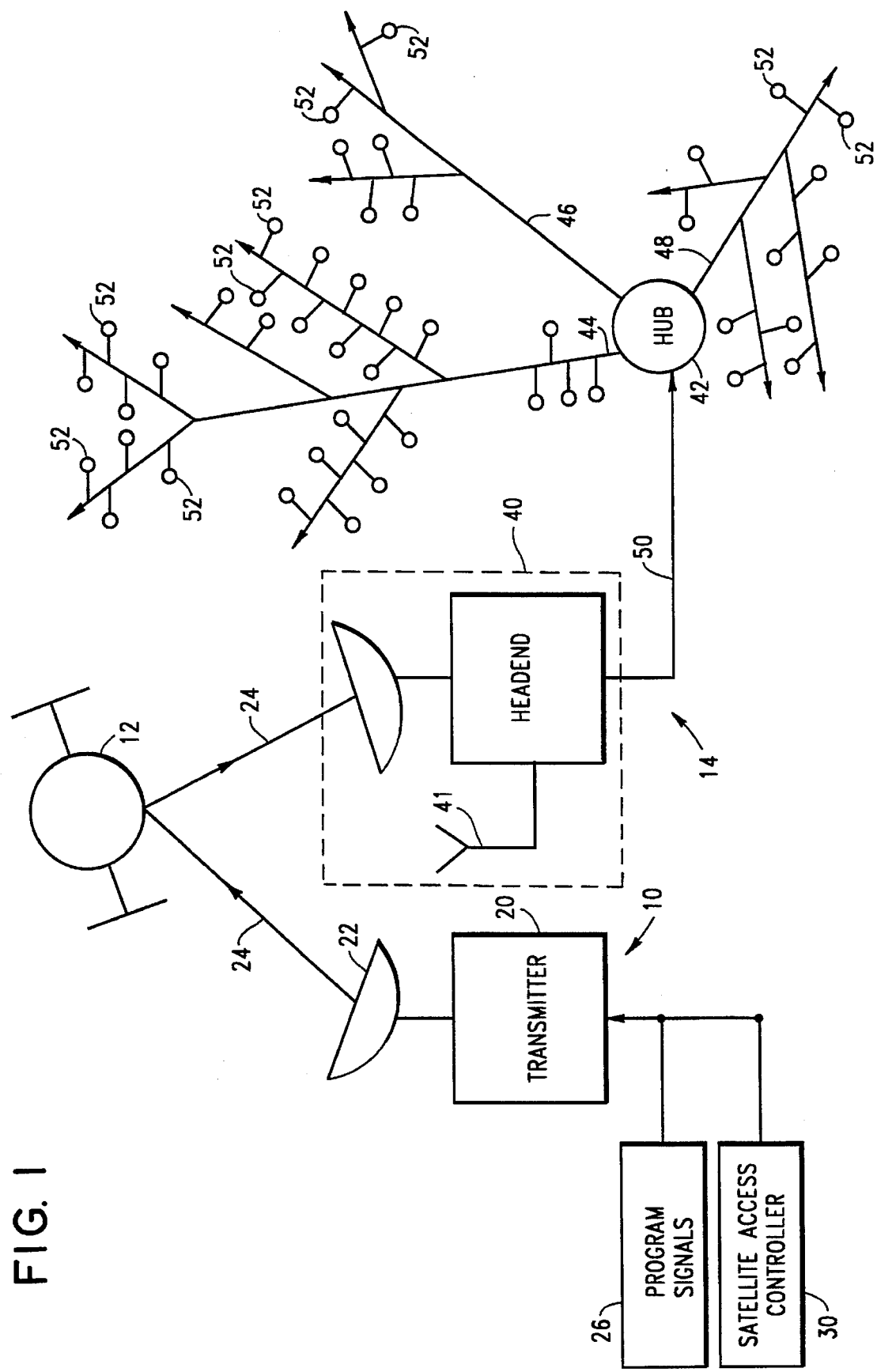
FIG. 1 is a schematic diagram showing a satellite transmission system and a cable television network in accordance with the present invention.

FIG. 1 illustrates a satellite uplink transmission system generally designated 10, a satellite 12, and a cable television network generally designated 14 in accordance with the present invention. Cable television network 14 is illustrated herein as a public cable television network, however, it will be appreciated that the present invention may also be used in connection with private cable systems such as those serving an apartment complex, hotel or institution. Moreover, the present invention is also useful in securing local area networks (LAN) and wide area networks (WAN). It will be noted that the cable television network 14 may be considered a wide area network.

The satellite transmission system 10 includes a transmitter 20 and a dish 22 for transmitting digital signals 24 up to the satellite 12. A plurality of different digital signals are preferably transmitted in a multiplexed format, although it will be appreciated that any suitable format may be employed. Transmitter 20 receives input from several sources including programmer audio and video channels 26 which may be, for example, television programming such as that sold under one or more of the service marks "SHOWTIME", "HOME BOX OFFICE", and "ESPN". Also providing input to the transmitter 20 may be a satellite access controller 30, which will be more fully described hereinafter.

The cable television network 14 includes a headend 40, a distribution hub 42, and a plurality of segments or branches 44, 46, and 48 extending from the hub 42. Headend 40 and hub 42 are connected by a trunk line 50. Each of branches 44, 46, and 48 terminates in a plurality of subscriber ports 52 for end use of the digital signals 24. It will be appreciated that the network 14 is illustrated as a tree and branch network although any type of network may be utilized including e.g., a star network. Additionally, one hub 42 and three branches 44, 46, and 48 are depicted herein for illustration only and any number of each may be employed. Further, the hub 42 may be located at the headend 40 although it is not shown herein as such.

Figure 2:
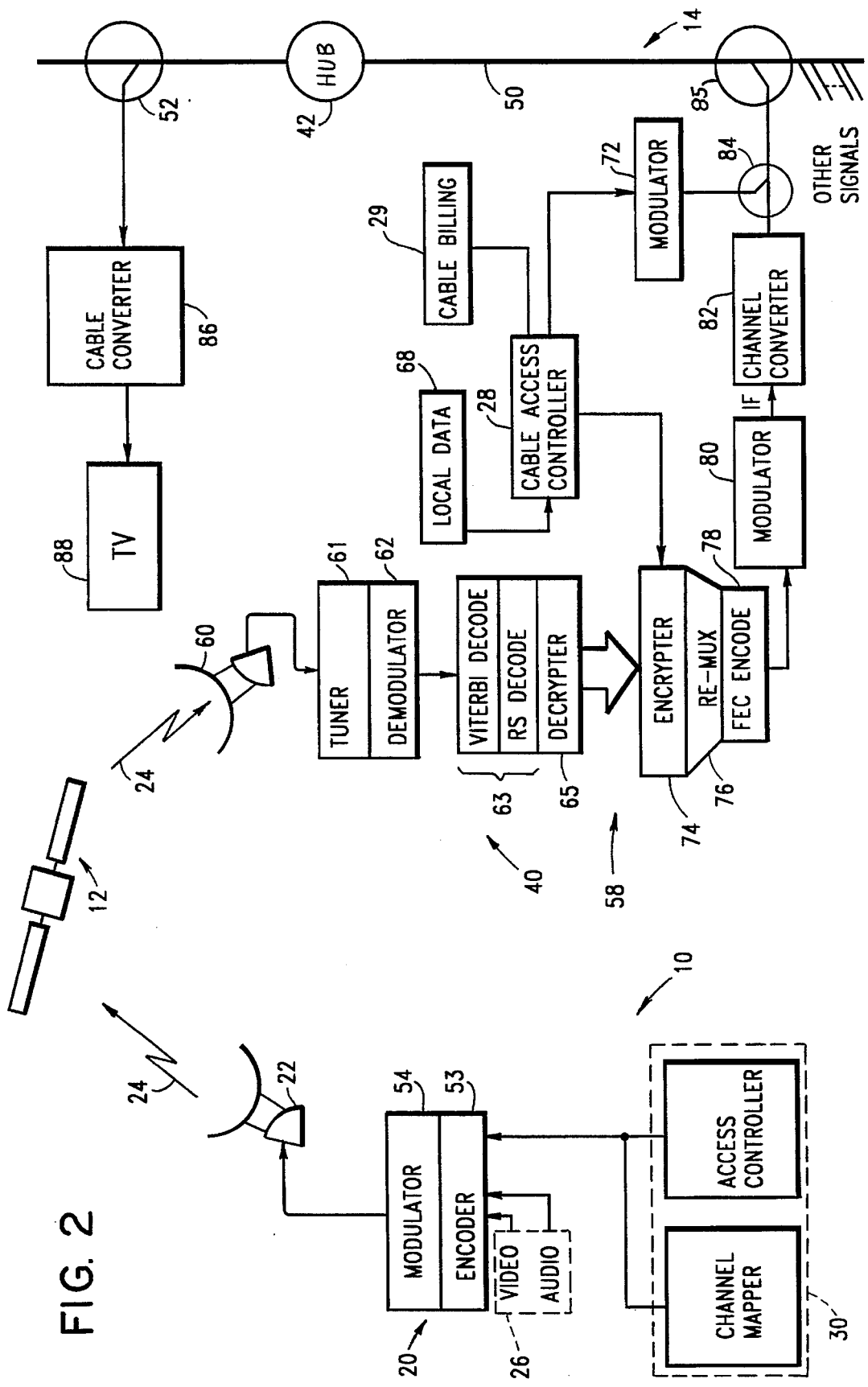
FIG. 2 is a block diagram of the satellite transmission system and cable network of FIG. 1.

Referring now also to FIG. 2, a cable access controller 28 is shown as located at the headend 40, however, it may alternatively be located at the satellite uplink 10. The controller 28 provides cable access and billing information (via billing processor 29) for subscribers. In this way, the controller 28 provides an authorization data stream which includes authorization data for each subscriber such as channel authorization and user features, e.g. parental control. The controller 28 also includes a channel mapper for assigning cable channels to each of a plurality of program signals. The controller 28 may also provide data such as teletext and program guides.

The satellite access controller 30 at the satellite uplink similarly includes a channel mapper and an access controller. The channel mapper is a conventional device that provides mapping information of the audio and video program signals 26 to specific satellite channels for passage over the satellite 12. This mapping information is coupled, together with the actual program signals 26 to an encoder 53, described below. The access control portion of the satellite access controller 30 is also conventional, and provides decryption authorization data for use in decrypting the digital signals 24 transmitted by transmitter 20.

The satellite uplink transmitter 20 includes an encoder 53 and a modulator 54. The encoder 53 encrypts the program and satellite control signals 26 and 30 respectively. A plurality of program signals (e.g. HBO, SHOWTIME, ESPN, etc.) is multiplexed with the control signals, prior to transmission, using a first encryption scheme. Encoder 53 can comprise for example, a VideoCipher® satellite uplink encrypter which is manufactured by General Instrument Corporation of San Diego, Calif., U.S.A. The modulator 54 may be any suitable satellite modulator well known in the art, such as a quadrature phased shift keying (QPSK) or quadrature amplitude modulation (QAM) modulator. It will be appreciated that an error correcting coding scheme, such as a Viterbi inner code concatenated with a Reed-Solomon outer code, may be used to process the data to be transmitted prior to being passed on to modulator 54.

The headend 40 includes a headend reencryption transcoder generally designated 58 (FIG. 2) for receiving, decrypting, reencrypting, and retransmitting the multiplex of digital program and control signals 24. Dish 60 is provided for receiving the digital signals 24 from satellite 12. A satellite tuner 61 and QPSK demodulator 62 are provided to demodulate the multiplex of signals 24 for further processing. It will be appreciated that as a result of demodulation, the digital signals 24 may be separated in real (Q) and imaginary (I) planes although, for simplicity, this is not shown in the drawings. A forward error correcting (FEC) decoder 63, including Viterbi and Reed-Solomon decoders, is provided for decoding signals 24. The digital signals 24 may then be decrypted by a decrypter 65. The decrypter 65 can decrypt all, a desired plurality, or even one of the different program signals contained in multiplex 24.

Authorization data which originates at the cable access controller 28 is used, e.g., for authorizing decryption of particular signals by particular subscribers downstream of the headend. The cable access controller 28 can optionally or alternatively receive local control data 68, which may include authorization data, tag data and converter control data. Authorization data may include e.g., encryption keys for use by subscriber converters in decrypting programs the subscriber is authorized to receive. Information for external (e.g. subscriber) use, such as program identifiers, may be sent as tag data. Converter control data is generated for remotely addressing a subscriber converter from the headend 40 in the event of, for example, a programming change or an impulse purchase of a program by a subscriber. The converter control data can also comprise local channel mapping information and/or parental control access information.

One output of the cable access controller 28 carries the authorization data, tag data and/or converter control data that is not specific to any one of the programs carried in the multiplex 24 to a modulator 72. Modulator 72 may be an FM or QPSK modulator that modulates the data received from the transcode controller onto a separate carrier, preferably "out of band" with respect to the encrypted video and audio signals, for communication to subscriber converters coupled to ports 52. Alternatively, in band distribution of the non-program specific data could be provided using a microwave multichannel distribution system (MMDS).

In accordance with an important feature of the present invention, the decrypted digital signals 24 are reencrypted prior to retransmission from the headend 40 and preferably without changing the underlying format of the signal, e.g. from digital to analog. To achieve this, the individual decrypted digital signals 24 from decrypter 65 are passed through an encrypter 74, and then are remultiplexed at 76 to provide a reencrypted multiplex of signals for transmission under the encryption scheme provided by the encrypter 74. The reencrypted signals may be again FEC encoded at an FEC encoder 78 for transmission over the CATV network 14. The encrypter 74 preferably uses an encryption scheme which differs from the first encryption scheme used by encoder 53 at satellite uplink 10. For example, different versions of the Data Encryption Standard (DES) could be used. DES is described in *Federal Information Processing Standards Publication* 46 ("FIPS Pub. 46") issued by the National Bureau of Standards, United States Department of Commerce, "Announcing the Data Encryption Standard," Jan. 15, 1977 and *FIPS Pub.* 74, "Guidelines for Implementing and Using the NBS Data Encryption Standard," Apr. 1, 1981. It is also possible to simply use different encryption keys at the headend than were used at the satellite uplink instead of changing the entire encryption scheme.

A modulator 80, which can comprise a QAM modulator (e.g.,64-QAM), is provided for modulating the reencrypted and FEC encoded digital signals 24 at an intermediate frequency. A channel converter 82 is provided for upconverting the digital signals 24 for use by subscribers. The reencrypted and FEC encoded digital signals 24 are combined with the non-program specific data from modulator 72 at a coupler 84, for communication to subscribers via cable network 14. It should be appreciated that the digital signals 24 may alternatively be transmitted as baseband signals over the cable network 14 without being modulated onto a carrier.

Other signals, which may include unscrambled video and audio, audio only and/or data only signals may be combined with the reencrypted and FEC coded digital signals 24 at a coupler 85 for distribution over cable network 14 to subscriber ports 52 via hub 42.

One more or more subscriber converter(s) 86 are connected to each active subscriber port 52 for receiving, decrypting and converting the digital signals 24 for reproduction on a subscriber appliance such as a television set 88. The converter 86 receives the program signals 24, authorization and control data for decryption of the program signals, and tag data (e.g., for program identification) as described above.

Figure 3:
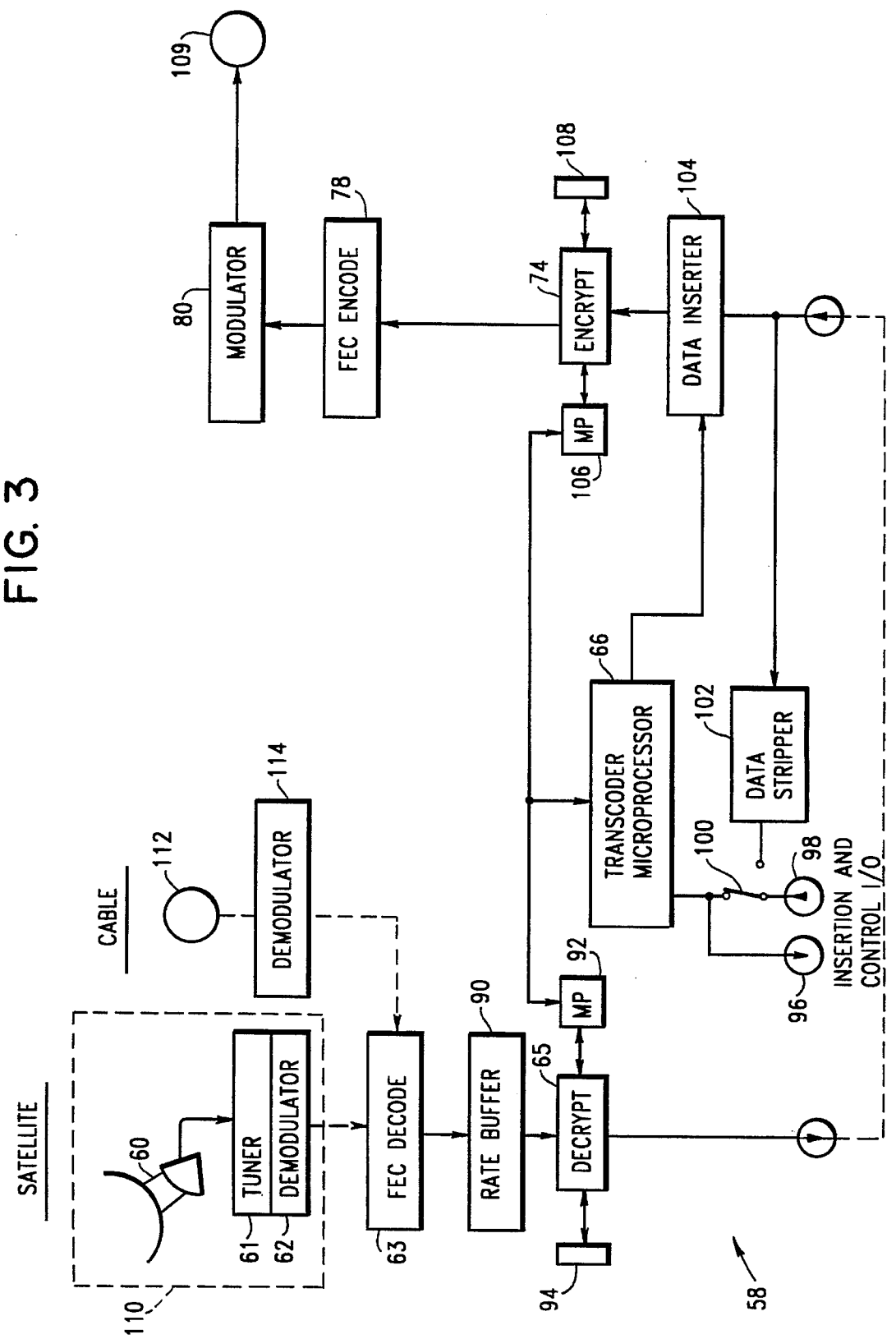
FIG. 3 is a block diagram of a reencryption transcoder for controlling access to digital signals in accordance with the present invention.

As shown in more detail in FIG. 3, the reencryption transcoder 58 includes a rate buffer 90 for buffering the signals 24 from the FEC decoder 63, prior to input to decrypter 65. Decrypter 65 communicates with a microprocessor 92 which, in turn, is coupled to a transcode microprocessor 66 for receipt and processing of the authorization and tag data. The microprocessor 92 may provide the decrypter 65 with mapping information for decrypting various specific channels in the multiplexed signal 24. A replaceable security element 94 may be used as is well known for adding one or more additional layer(s) of security. Such a replaceable security element is disclosed, for example, in U.S. Pat. No. 5,111,504 to Esserman et al. The transcode microprocessor 66 may also control the change of, e.g., encryption keys which may vary on a routine basis. For example, once or more each month, the encryption keys may be changed to make it more difficult to breach the system security.

The transcode microprocessor 66 outputs control data via connector 96, such as the out of band control data passing through modulator 72 (FIG. 2). Local authorization and control data 68 is received at a connector 98, and is passed to the transcode microprocessor 66 via a switch 100 which may toggle between insertion of the local data and data received via a data stripper 102. An input/output control processor (not shown) may be provided for controlling transfer of data via the connectors 96 and 98.

The data stripper 102 strips off the cable authorization data stream from the received and decrypted multiplex of digital signals 24 prior to reencryption by encrypter 74. As noted above, the authorization data stream originates from the cable access controller 28 at the headend 40 or the uplink 10 and, as previously discussed, is used to control access to programs by subscribers.

A data inserter 104 is provided for combining data from the transcode microprocessor 66 with the decrypted digital signals 24. The inserted data is used, for example, by the encrypter 74 in generating encryption keys for reencrypting signal 24. The encrypter 74 communicates with a microprocessor 106 for mapping purposes in a manner similar to that described for the decrypter 65. A replaceable security element 108 may be provided to enable security to be updated as required. The reencrypted digital signals 24 are then FEC encoded and modulated as discussed in connection with FIG. 2 for output to channel converter 82 via terminal 109.

In accordance with another important feature of the present invention, the hub 42 (FIGS. 1 and 2) may include a reencryption transcoder 58. In this way, signals 24 may again be decrypted and then reencrypted in another encryption scheme to thereby further segment the cable network 14. To achieve this, rather than receiving digital signals 24 by way of satellite receiver 110, signals 24 are received via cable connector 112 (FIG. 3) which is connected to trunk line 50 and then passed to a demodulator 114. Thereafter, the digital signals 24 may be decrypted and reencrypted according to FIG. 3 as discussed above.

Figure 4:
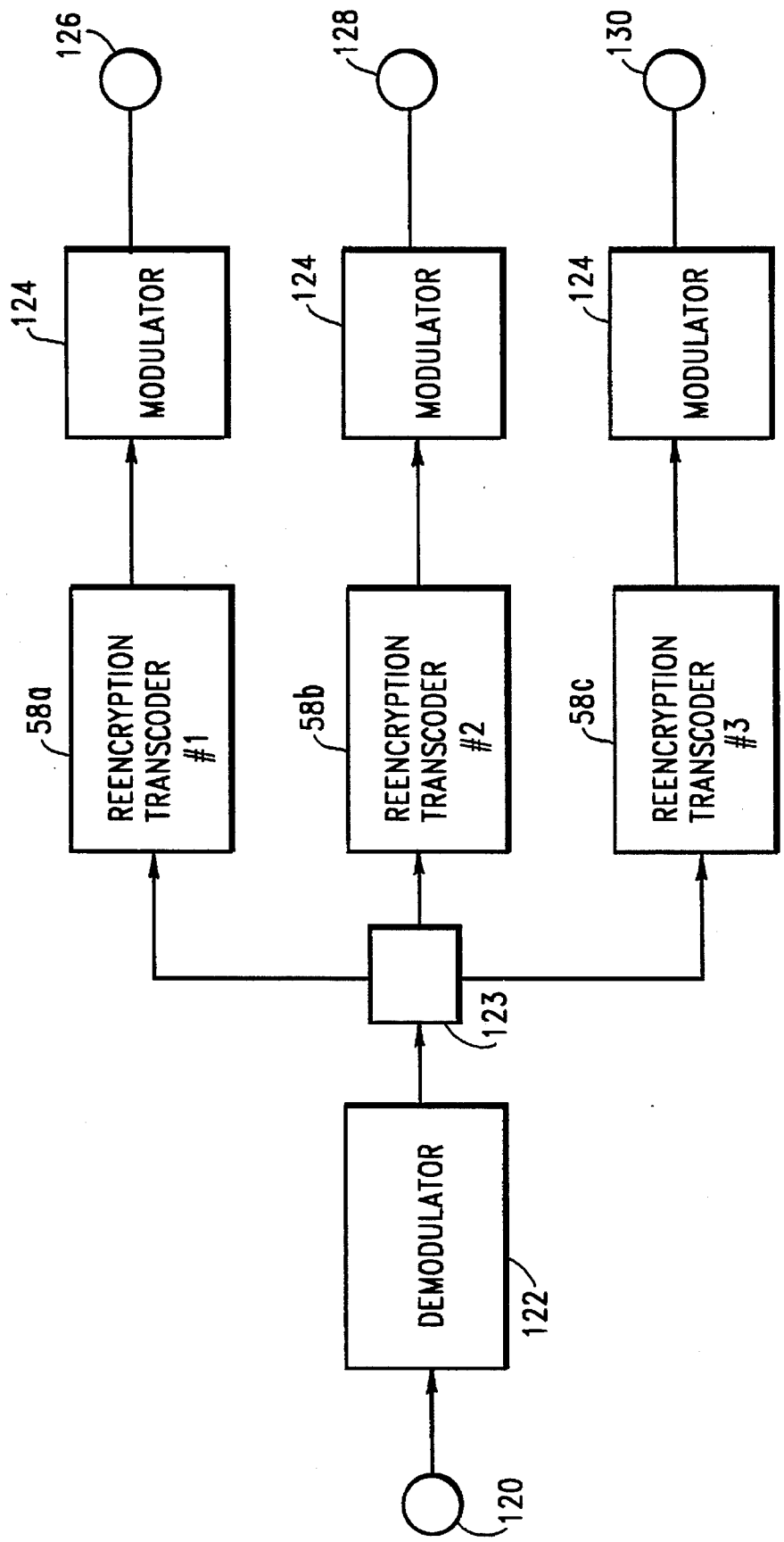
FIG. 4 is a block diagram showing a plurality of reencryption transcoders used to provide different encryption schemes along different network segments in accordance with the present invention.

To even further segment the network 14, each branch 44, 46 and 48 may include one or more additional hubs (not shown) each having a reencryption transcoder 58 located therein for decrypting and reencrypting digital signals 24 with different encryption schemes. An additional embodiment is illustrated in FIG. 4. This embodiment provides a means for encrypting the digital signals 24 in a plurality of different encryption schemes for passage along separate branches of the network 14. In this embodiment, digital signals 24 are received at the hub 42 via terminal 120 and are first demodulated and decrypted at 122 as described above. Thereafter the digital signals 24 are split at a splitter 123 for passage to a plurality of reencryption transcoders 58a, 58b, . . . 58c. Each of the reencryption transcoders preferably provides a different encryption scheme for communication of the digital signals 24 over separate branches of the network 14. Modulators 124 are provided for remodulating the separately reencrypted digital signals 24. Terminals 126, 128, and 130 each connect to a respective branch 44, 46, and 48 of the CATV network 14 shown in FIG. 1. It is also contemplated that a plurality of reencryption transcoders 58 may be disposed at one or more additional locations within the network 14 for providing additional encryption schemes throughout the network. Such structure reduces the incentive to a pirate of solving a particular encryption scheme, by reducing the size of a market associated therewith.

It will also be apparent that the digital signals 24 may be split at splitter 123 into various programmer and service groups based upon type of service required, price of service, tiering, billing etc. Additionally, digital signals 24 may be split into various packages at any point in the network.

It should now be appreciated that the present invention provides a practical system for segmenting a communication network such as a local or wide area network to provide enhanced security and additional control of functions such as pricing, tiering, and billing for a subscriber. In particular, digital signals are secured using one access control and encryption system for one segment, and, without affecting the underlying information signal, security is replaced using a secondary access control system for secondary branches in the broadcast network. In the illustrated embodiment, digital signals originate at a satellite uplink site, and are encrypted and secured using an access control system whose purpose is to deliver the signal securely to satellite television consumers and cable system headends. A particular access control and billing system is established for this application, and pricing, tiering, etc. are established. Without decompressing or otherwise changing the format of the underlying information signal (e.g., from digital to analog), the signal is decrypted using the satellite access control system, and subsequently re-encrypted using an access control system specific to the particular cable system for which it is destined. This allows each cable system to custom tailor its tiering, pricing, billing, channel packaging and marketing strategy, by dissociating its local access control system from that of the satellite system. An additional benefit of the segmentation process is to break the universe into many smaller, individually secured segments, reducing the size of potential pirate targets, and easing recovery in the case of a security breach.

A transcoding device, located in the cable system headend, performs the re-encryption process. The transcoder is authorized to perform decryption of the satellite signal by the satellite authorization system, and is given appropriate reencryption parameters by a cable access control computer. The cable access control computer may be located at the satellite uplink, with the transcoder, at a remote site such as a nearby business office, or at a national or international authorization center.

What is claimed is:

1. A method for independently controlling, in each of a plurality of different paths of a cable communication network, access to at least one compressed digital information signal distributed over said paths from a service provider, while maintaining said information signal in its compressed state, comprising the steps of:

receiving said compressed digital information signal at the headend of the cable network via a first communication path encrypted under a first encryption scheme;

adding at least one of tiering and pricing information to said compressed digital information signal at said headend to allow a cable network operator to tailor the delivery of services to different subscriber groups; and distributing said compressed digital information signal in its still compressed state with the information added during said adding step from the headend to a plurality of subscribers groups over said plurality of different paths, the signal in each path being encrypted under a different encryption scheme;

wherein access to said compressed digital information signal in said different paths is provided to said subscriber groups based on said different encryption schemes.

2. The method of claim 1, comprising the further steps of:

receiving said still compressed digital information signal from one of said plurality of different paths;

decrypting the received, still compressed digital information signal, and decompressing the decrypted, received digital information signal for use by an authorized subscriber who is a member of one of said subscriber groups.

3. The method of claim 1, comprising the further step of:

decrypting said still compressed digital information signal prior to its reencryption during said distributing step.

4. The method of claim 1 wherein the different encryption schemes on the plurality of different paths are used to control access to the compressed digital information signal based upon at least one of said subscriber group and services.

5. The method of claim 1 wherein said adding step modifies control data transmitted with said compressed digital information signal over said first communication path prior to distributing said digital signal over said plurality of different paths.

6. The method of claim 5 wherein said control data comprises at least one of said tiering and pricing information for enabling an authorized subscriber to use the compressed digital information signal.

7. The method of claim 1 comprising the further step of:

distributing said still compressed digital information signal from one of said plurality of different paths to a branch extending from that path;

wherein the encryption scheme for said branch differs from the encryption scheme used for the path from which said branch extends.

8. The method of claim 7 wherein said still compressed digital signal is distributed using a plurality of different encryption schemes for transmission from the headend to a plurality of subscribers groups over a corresponding plurality of different branches;

wherein each of said encryption schemes comprises an encryption algorithm and a cryptographic key, and not all of said cryptographic keys are the same.

9. The method of claim 1 wherein said compressed digital signal is at least one of a television, audio, and data signal.

10. A communication network for the secure distribution of a compressed digital television signal comprising:

a headend for receiving an encrypted, digital television signal from a satellite television link in its still compressed state;

decryption means at said headend for decrypting the received television signal in its still compressed state;

means for adding at least one of tiering and pricing information to said television signal at said headend to allow a cable network operator to tailor the delivery of services to different subscriber groups;

first distributing means at said headend for reencrypting and transmitting the decrypted television signal in its still compressed state using a different encryption scheme than that provided over said satellite television link;

means for coupling the reencrypted digital television signal to a cable television path for distribution to a first group of subscribers;

second distribution means for reencrypting and transmitting the digital television signal in its still compressed state using a different encryption scheme than that provided by said first distribution means; and means for coupling the reencrypted digital signal from said second distribution means to said cable television path for use by a second group of subscribers.

11. The network of claim 10, wherein said second distribution means are located along said cable path.

12. The network of claim 10 further comprising a subscriber decoder for receiving and decrypting digital television signals from said cable television path.

13. The network of claim 10 wherein said adding means modifies control data transmitted with said digital television signals over said satellite television link for subsequent communication to at least one of said groups of subscribers over said cable television path.

14. A method comprising the steps of:

transmitting first encrypted, compressed digital signals from a service provider at a first location to the headend of a cable network at a second location via a first communication path;

receiving the first encrypted, compressed digital signals at said headend;

adding at least one of tiering and pricing information to said digital signal at said headend to allow a cable network operator to tailor the delivery of services to different subscriber groups;

transforming the received first encrypted, compressed digital signals to second and third encrypted, compressed digital signals without decompressing the signals, said second and third encrypted, compressed digital signals each having different encryption than the other;

transmitting the second encrypted, still compressed digital signals from said headend to a third location via a second cable communication path; and transmitting the third encrypted, still compressed digital signals from said headend to a fourth location via a third cable communication path.

15. The method of claim 14 wherein said compressed digital signals are compressed digital television signals.

* * * * *